(12) United States Patent
Van Willigenburg

(10) Patent No.: US 11,021,365 B2
(45) Date of Patent: Jun. 1, 2021

(54) STEAM REFORMING PROCESS

(71) Applicant: SABIC GLOBAL TECHNOLOGIES B.V., Bergen op Zoom (NL)

(72) Inventor: Joris Van Willigenburg, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/333,746

(22) PCT Filed: Aug. 29, 2017

(86) PCT No.: PCT/IB2017/055180
§ 371 (c)(1),
(2) Date: Mar. 15, 2019

(87) PCT Pub. No.: WO2018/051204
PCT Pub. Date: Mar. 22, 2018

(65) Prior Publication Data
US 2019/0359484 A1 Nov. 28, 2019

(30) Foreign Application Priority Data
Sep. 19, 2016 (EP) .................................. 16189376.3

(51) Int. Cl.
*C01B 3/34* (2006.01)
(52) U.S. Cl.
CPC ........ *C01B 3/34* (2013.01); *C01B 2203/0233* (2013.01); *C01B 2203/046* (2013.01);
(Continued)
(58) Field of Classification Search
None
See application file for complete search history.

(56) References Cited

U.S. PATENT DOCUMENTS 3,339,371 A * 9/1967 Ichihara ................. F25J 3/0252
62/619
3,361,534 A * 1/1968 Johnson ................. F25J 3/0233
423/653
(Continued)

FOREIGN PATENT DOCUMENTS

WO   WO 01/25142   4/2001

OTHER PUBLICATIONS

Häussinger et al., "Hydrogen, 2. Production" *Ullmann's Encyclopedia of Industrial Chemistry*, 2012, Wiley-VCH Verlag GmbH & Co. KGaA, Weinheim, vol. 18, pp. 249-307.
(Continued)

*Primary Examiner* — Derek N Mueller
(74) *Attorney, Agent, or Firm* — Norton Rose Fulbright US LLP

(57) ABSTRACT

Steam reforming system having a steam cracker and a steam reformer. The steam cracker includes a steam cracking unit to steam crack a feed stream to produce a stream comprising hydrogen, methane and C2+ hydrocarbons; a heat exchanger for cooling the steam cracking product stream; a separation unit for separating the cooled steam cracking product stream into a gas stream including hydrogen and methane and a liquid stream including methane and C2+ hydrocarbons, a demethanizer which is fed the liquid stream producing a third stream containing at least 95% methane and a fourth stream comprising C2+ hydrocarbons. The steam reformer includes a feed preheater which is fed the third stream and steam to provide a preheated stream and a steam reforming unit arranged for heating the preheated stream to at least 800° C. to steam reforming the heated stream and obtain a product stream containing hydrogen and $CO_2$.

2 Claims, 1 Drawing Sheet

(52) U.S. Cl.
CPC ............... *C01B 2203/0872* (2013.01); *C01B 2203/1241* (2013.01)

(56) References Cited

U.S. PATENT DOCUMENTS

| | | | |
|---|---|---|---|
| 3,855,339 A * | 12/1974 | Hosoi | C10G 9/36 208/130 |
| 3,862,899 A | 1/1975 | Murphy et al. | |
| 4,297,204 A | 10/1981 | Schliebener et al. | |
| 4,413,153 A | 11/1983 | Garwood et al. | |
| 4,599,478 A | 7/1986 | Kamisaka et al. | |
| 4,740,290 A | 4/1988 | Tomita et al. | |
| 5,979,177 A | 11/1999 | Sumner et al. | |
| 2006/0127305 A1 | 6/2006 | Pinault et al. | |
| 2012/0024749 A1 | 2/2012 | Strack et al. | |

OTHER PUBLICATIONS

International Search Report and Written Opinion issued in International Patent Application No. PCT/IB2017/055180, dated Nov. 1, 2017.
Gary, et al. "Petroleum Refining: Technology and Economics," *CRC Press, Taylor & Francis Group*, 2007, 5:273-277, 334.
Office Action issued in corresponding Iranian Patent Application No. 139750140003010265, dated Oct. 2, 2019.
Search Report and Written Opinion issued in corresponding Singaporean Patent Application 11201901966X, dated Jun. 9, 2020. (6 pages).
Office Action issued in counterpart European Patent Application No. 17768872.8, dated Jan. 15, 2021.
Zimmermann, et al. "Ethylene," *Ullmann's Encyclopedia of Industrial Chemistry*, 2009.

* cited by examiner

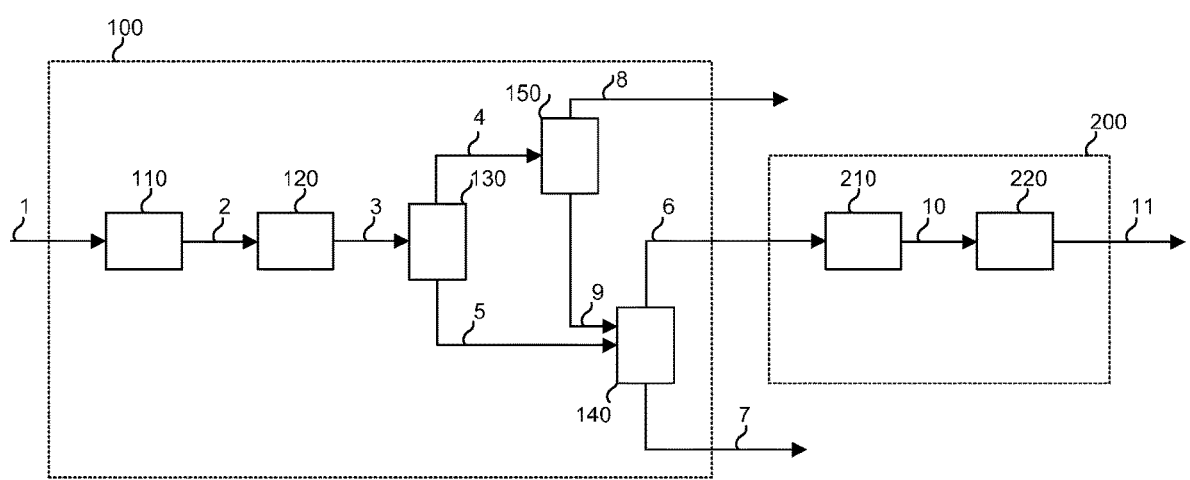

STEAM REFORMING PROCESS

CROSS-REFERENCE TO RELATED APPLICATIONS

This application is a national phase under 35 U.S.C. § 371 of International Application No. PCT/IB2017/055180, filed Aug. 29, 2017, which claims the benefit of priority of European Patent Application No. 16189376.3, filed Sep. 19, 2016, the entire contents of each of which are hereby incorporated by reference in their entirety.

FIELD OF THE INVENTION

The invention relates to a steam reforming system. The invention further relates to a steam reforming process.

BACKGROUND OF THE INVENTION

Hydrogen production through steam reforming of natural gas is a well-established technology. An example of a steam reformer is described in Ullmann's Encyclopedia of Industrial Chemistry, in chapter "Hydrogen, 2. Production". The steam reformer illustrated in FIG. 10 of p. 266 of this book contains a feed preheater in the convection section of the furnace that preheats the feed with heat available from the convective heat transfer from hot flue gas for the reformer furnace. After this step the feed is heated to temperatures well above 800° C. in reformer tubes filled with catalyst to produce hydrogen.

U.S. Pat. No. 4,297,204 describes. in a process for the thermal cracking of hydrocarbons to produce olefins, an improvement of recovering hydrocarbons boiling above 200° C. from the thermal cracking stage, preferably removing polymeric components therefrom, catalytically hydrogenating resultant hydrocarbons boiling above 200° C., and recycling resultant hydrogenated hydrocarbons to the thermal cracking stage (see Abstract).

U.S. Pat. No. 4,740,290 describes a process for the thermal cracking of heavy oil containing nonvaporizable, high-molecular weight hydrocarbon in the presence of steam in one or more thermal cracking tubes or ducts, which process is characterized in that a fluid comprising steam and heavy oil is flowed through a thermal cracking tube such that thermal cracking is carried out under the following conditions: (a) temperature of the fluid in the thermal cracking tube: 800° to 1100° C.; (b) pressure of the fluid in the thermal cracking tube: 0 to 50 kg/cm$^2$G; (c) flow rate or velocity of fluid through the thermal cracking tube: 10 to 100 m/sec, and (d) residence time of the fluid in the thermal cracking tube: at least 0.2 seconds. U.S. Published Application No. 2006/0127305 A1 discloses a process for treating a hydrocarbon feed comprising a series of a first upstream process for hydrocarbon hydroconversion comprising at least one reaction chamber, the reaction or reactions occurring inside said chambers and employing at least one solid phase, at least one liquid phase and at least one gas phase, and a second downstream steam reforming process comprising at least one reaction chamber, characterized in that the said upstream process is carried out in a "slurry" and/or an ebullated bed mode and in that the downstream process comprises a first step for at least partial conversion of hydrocarbons heavier than methane into methane, termed the pre-reforming step, and in that the reaction or reactions occurring inside the chambers of the downstream stream reforming process enables the production of a reagent namely hydrogen, which is necessary for the reactions in the first upstream process.

U.S. Pat. No. 3,862,899 describes the production of synthesis gas and clean fuels by the integration of fluid catalytic cracking and catalytic steam reforming, and, more particularly, the disclosure relates to a combination of process steps in which a heavy hydrocarbon oil is cracked in a heavy oil catalytic cracking unit to produce a cracked overhead effluent which is hydrogenated and the resulting saturated desulfurized effluent is reformed in a catalytic steam reforming unit to produce synthesis gas. U.S. Pat. No. 3,862,899 also relates to the production of substitute natural gas and to the production of substitute natural gas and low sulfur fuel oil by the multi-step processing of crude oil as described therein.

WO 01/25142 discloses a process for preparation of synthesis gas, i.e. mixtures containing dihydrogen and oxides of carbon, from feedstocks containing methane and/ or higher hydrocarbons having from about 2 to about 12 carbon atoms by an initial catalytic treatment of feedstock to provide a methane-containing gaseous mixture substantially free of compounds having 2 or more carbon atoms, and reforming the gaseous mixture at elevated temperatures using nickel-containing catalytic materials that are unusually active under mild conditions of conversion and resistant to deactivation, wherein the process consists fundamentally in converting the higher hydrocarbon compounds to form a methane-containing gaseous mixture substantially free of compounds having 2 or more carbon atoms in an initial conversion zone containing a catalyst while controlling temperatures within the initial conversion zone to temperatures in a range of temperature downward from about 500° C. to about 300° C., and reforming the methane-containing gaseous mixture with steam and/or carbon dioxide in a subsequent zone containing catalyst at elevated temperatures and pressure sufficient to form synthesis gas.

The production of hydrogen through steam reforming is energy intensive. The reformer furnace provides the required reaction heat as well as the heat for the reactor feed to reach the reaction temperature from the temperature after the feed preheating. One of the important factors that determine the amount of fired fuel required by the furnace is the temperature of the feed after preheating.

It is commonly known that hydrocarbons start thermal cracking at high temperatures, instead of steam reforming. A known undesired effect of thermal cracking is coke formation on the feed preheating tubes in the convection bank. Therefore, the temperature at the feed preheating tubes should be kept below a temperature where significant cracking of the feedstock occurs. Lighter hydrocarbons require higher temperatures for this thermal cracking to occur than heavier hydrocarbons. At the temperature where methane does not crack, other components in the feedstock such as ethane and heaver components can crack.

Further, the catalyst in the reformer tube is very sensitive to sulfur containing components and a device is typically installed in a steam reformer to remove these components from the feed.

OBJECTS OF THE INVENTION

It is an objective of the present invention to provide a steam reforming system and process by which the above-mentioned and/or other problems are solved.

SUMMARY OF THE INVENTION

Accordingly, the invention provides a steam reforming system comprising a steam cracker (100) and a steam reformer (200), wherein the steam cracker (100) comprises i) a steam cracking unit (110) arranged for steam cracking a steam cracking feed stream (1) to produce a steam cracking product stream (2) comprising hydrogen, methane and C2+ hydrocarbons, ii) a heat exchanger (120) for cooling the steam cracking product stream (2) to provide a cooled steam cracking product stream (3), iii) a separation unit (130) arranged for separating the cooled steam cracking product stream (3) into a first, gas stream (4) comprising hydrogen and methane and a second, liquid stream (5) comprising methane and C2+ hydrocarbons, iv) a demethanizer (140) arranged for being fed at least with the second stream (5) and producing a third stream (6) comprising methane and a fourth stream (7) comprising C2+ hydrocarbons, wherein the amount of methane in the third stream (6) is at least 95 wt %; and the steam reformer (200) comprises v) a feed preheater (210) arranged for being fed with the third stream (6) and steam to provide a preheated stream (10) and vi) a steam reforming unit (220) arranged for heating the preheated stream (10) to a temperature of at least 800° C. and steam reforming the heated stream to obtain a steam reforming product stream (11) comprising hydrogen and $CO_2$.

The reference numerals mentioned herein refer to the embodiment illustrated in the drawing described later, but it will be appreciated that they are used only for the purpose of explanation and the invention is not limited to the embodiments illustrated by the drawing.

The term "C2+ hydrocarbons" is herein understood to mean hydrocarbon molecules having 2 or more carbons.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. It is further noted that the term 'comprising' or related terms such as those mentioned above do not exclude the presence of other elements. However, it is also to be understood that a description on a product/composition comprising certain components also discloses a system, method or process, or a composition consisting of these components or steps. The product, system or composition consisting of these components or steps may be advantageous in that it offers a simpler, more solution. Similarly, it is also to be understood that a description on a process comprising certain steps also discloses a process consisting of these steps.

The system and method of the present invention can "comprise," "consist essentially of," or "consist of" particular components, compositions, steps, etc. disclosed throughout the specification.

When values are mentioned for a lower limit and an upper limit for a parameter, ranges made by the combinations of the values of the lower limit and the values of the upper limit are also understood to be disclosed.

In the context of the present invention, ten embodiments are now described. Embodiment 1 provides a steam reforming system. The steam reforming includes a steam cracker and a steam reformer, wherein the steam cracker includes a steam cracking unit arranged for steam cracking a steam cracking feed stream to produce a steam cracking product stream comprising hydrogen, methane and C2+ hydrocarbons; a heat exchanger for cooling the steam cracking product stream to provide a cooled steam cracking product stream; a separation unit arranged for separating the cooled steam cracking product stream into a first, gas stream comprising hydrogen and methane and a second, liquid stream comprising methane and C2+ hydrocarbons; a demethanizer arranged for being fed at least with the second stream and producing a third stream containing methane and a fourth stream comprising C2+ hydrocarbons, wherein the amount of methane in the third stream is at least 95 wt %; and the steam reformer includes a feed preheater arranged for being fed with the third stream and steam to provide a preheated stream and a steam reforming unit arranged for heating the preheated stream to a temperature of at least 800° C. and steam reforming the heated stream to obtain a steam reforming product stream comprising hydrogen and $CO_2$. Embodiment 2 is the system according to embodiment 1 wherein the third stream comprises C2+ hydrocarbons at an amount of less than 3 wt %, more preferably less than 2 wt %, more preferably less than 1 wt % and more preferably less than 0.5 wt %. Embodiment 3 is the system according to any one of embodiments 1 or 2, wherein the amount of C2+ hydrocarbons in the fourth stream is at least 99 wt %. Embodiment 4 is the he system according to any one of embodiments 1 to 3, wherein the preheated second stream has a temperature of at least 500° C. Embodiment 5 is the system according to any one of embodiments 1 to 4, wherein the steam cracker further includes a cryogenic separation unit for separating the first stream into a fifth, gas stream comprising hydrogen and a sixth, liquid stream (9) comprising methane, wherein the demethanizer (140) is arranged for further being fed with the sixth stream (9). Embodiment 6 is the system according to embodiment 5, wherein the amount of hydrogen in the fifth stream is at least 88 vol % and/or the amount of methane in the sixth stream is at least 95 wt %.

Embodiment 7 provides a steam reforming process using the system according to any one of Embodiments 1 to 6. The steam reforming process of embodiment 7 includes the steps of steam cracking the steam cracking feed stream by the steam cracking unit to produce the steam cracking product stream; cooling the steam cracking product stream by the heat exchanger to provide the cooled steam cracking product stream; separating the cooled steam cracking product stream into the first stream and the second stream by the separation unit; feeding at least the second stream to the demethanizer to produce the third stream and the fourth stream; feeding the third stream and steam to the feed preheater to provide the preheated stream; and heating the preheated stream to a temperature of at least 800° C. and steam reforming the heated stream by the steam reforming unit to obtain the steam reforming product stream. Embodiment 8 is the process of embodiment 7 using the system according to embodiments 5 or 6, and further comprising the step of separating the first stream into the fifth stream and the sixth stream by the cryogenic separation unit, wherein the step of feeding at least the second stream to the demethanizer to produce the third stream and the fourth stream involves feeding the second stream and the sixth stream to the demethanizer to produce the third stream and the fourth stream. Embodiment 9 is the process according to any one of embodiments 7 to 8, further including the step of feeding back the third stream from the demethanizer to the heat exchanger, to assist cooling of the steam cracking product stream. Embodiment 10 is the process according to any one of embodiments 7 to 9, further including the step of feeding back the fifth stream from the cryogenic separation unit to the heat exchanger, to assist cooling of the steam cracking product stream.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein. Other objects, features and advantages of the present invention will become apparent from the following FIGURE, detailed description, and examples. It should be understood, however, that the FIGURE, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

BRIEF DESCRIPTION OF THE FIGURES

FIG. 1 shows a steam reforming system according to the invention

DETAILED DESCRIPTION

According to the present invention, a methane-rich gas stream which is obtained by steam cracking (third stream) is fed to the feed preheater of the steam reformer. The invention is based on the realization that a steam cracking process produces, as a byproduct, a feed which is highly suitable as the feed for steam reforming. A steam cracking process requires a demethanizer which provides a very good separation between methane and C2+ hydrocarbons and therefore the methane-rich stream from the demethanizer of a steam cracker comprises essentially no C2+ hydrocarbons. Due to the low amount of C2+ hydrocarbons in the methane-rich stream from the steam cracking process, the methane-rich stream can be preheated to a relatively high temperature in the feed preheater without risking coke formation. Since the preheated second stream has a relatively high temperature, less fuel is required for the steam reforming unit for heating the preheated stream to the required temperature for steam reforming. Further, the methane-rich stream contains very low amount of sulfur, which allows feeding it to steam reforming without pretreatment for removing sulfur. The majority of the third stream is methane, but may further comprise hydrogen. Hydrogen in the third stream may be recovered by suitable means. For example, the third stream may be fed to a pressure swing adsorption unit to recover hydrogen, which unit may be present in the steam reformer or downstream of the steam reformer.

The present invention further provides a steam reforming process using the system according to the invention, comprising the steps of:
a) steam cracking the steam cracking feed stream (1) by the steam cracking unit (110) to produce the steam cracking product stream (2),
b) cooling the steam cracking product stream (2) by the heat exchanger (120) to provide the cooled steam cracking product stream (3),
c) separating the cooled steam cracking product stream (3) into the first stream (4) and the second stream (5) by the separation unit (130),
d) feeding at least the second stream (5) to the demethanizer (140) to produce the third stream (6) and the fourth stream (7),
e) feeding the third stream (6) and steam to the feed preheater (210) to provide the preheated stream (10) and
f) heating the preheated stream (10) to a temperature of at least 800° C. and steam reforming the heated stream by the steam reforming unit (220) to obtain the steam reforming product stream (11).

Accordingly, the cooled steam cracking product stream is separated by the separation unit to remove hydrogen gas (first stream) from the liquid hydrocarbons (second stream). The second stream is further fed to a demethanizer which removes methane (third stream) and produces the C2+ hydrocarbons (fourth stream). The fourth stream can be used as a product of steam cracking in any known way.

The third stream, which is a high purity methane stream, and steam are fed to the feed preheater of the steam reformer to be heated to a relatively high temperature, and the preheated stream is then subjected to steam reforming. Steam reforming can be performed in known way as e.g. described in Ullmann's Encyclopedia of Industrial Chemistry, in chapter "hydrogen, 2. Production". The steam reforming product stream mainly comprises hydrogen, steam, CO and $CO_2$. The steam and CO in the steam reforming product stream may further be reacted, such that the amount of hydrogen and $CO_2$ may e.g. be 85-95 vol % in the final stream.

The amount of methane in the third stream is at least 95 wt %. The third stream comprises little or no C2+ hydrocarbons in order to prevent coke formation on the tubes in the preheater at elevated temperatures. Preferably, the third stream comprises C2+ hydrocarbons at an amount of less than 3 wt %, more preferably less than 2 wt %, more preferably less than 1 wt % and more preferably less than 0.5 wt %.

Most of the C2+ hydrocarbons in the stream fed to the demethanizer will be in the fourth stream and the fourth stream should have a high purity of C2+ hydrocarbons. Preferably, the amount of C2+ hydrocarbons in the fourth stream is at least 99 wt %.

Preferably, before being fed to the feed preheater, the third stream from the demethanizer is fed back to the heat exchanger, to assist cooling of the steam cracking product stream. After passing the heat exchanger, the third stream may subsequently be fed to the feed preheater.

The steam cracking product stream may e.g. be a pyrolysis gas, but any product stream from a known steam cracking may be suitably used.

The compositions of the first stream and the second stream may vary depending on the composition of the steam cracking product stream and the separation conditions. The first stream comprises hydrogen, but may also contain a relatively large amount of methane and some C2 hydrocarbons, such as ethylene. Preferably, methane in the first stream is also fed to the feed preheater of the steam reformer. Accordingly, the system according to the invention preferably comprises a cryogenic separation unit in the steam cracker for extracting methane from the first stream.

Accordingly, in some preferred embodiments of the system according to the invention, the steam cracker (100) further comprises a cryogenic separation unit (150) for separating the first stream (4) into a fifth, gas stream (8) comprising hydrogen and a sixth, liquid stream (9) comprising methane, wherein the demethanizer (140) is arranged for further being fed with the sixth stream (9).

In the process using such system, the process further comprises the step of separating the first stream (4) into the fifth stream (8) and the sixth stream (9) by the cryogenic separation unit (150), wherein step d) involves feeding the second stream (5) and the sixth stream (9) to the demethanizer (140) to produce the third stream (6) and the fourth stream (7).

Accordingly, the first stream is fed to the cryogenic separation unit and is separated into the fifth stream (gas) which is mainly hydrogen and the sixth stream (liquid) which is mainly methane. Preferably, the amount of hydrogen in the fifth stream is at least 88 vol %, preferably at least 92 vol %. Preferably, the amount of methane in the sixth stream is at least 95 wt %. The sixth stream which is mainly methane is fed to the demethanizer, along with the second stream, for removing any remaining C2+ hydrocarbons. The demethanizer separates out methane as the third stream, which can be fed to the feed preheater of the steam reformer as described above.

Preferably, the fifth stream from the cryogenic separation unit is fed back to the heat exchanger, to assist cooling of the steam cracking product stream.

Preferably, the preheated stream has a temperature of at least 500° C., more preferably at least 600° C., more preferably at least 700° C. but below 800° C. The desired temperature will depend on the C2+ mass fraction of the third stream and operational optimization of the run length of the steam reformer and fuel consumption.

The invention is now further elucidated referring to the drawing in which FIG. 1 schematically illustrates an embodiment of the steam reforming system according to the invention.

Referring to FIG. 1, a steam reforming system comprising a steam cracker (100) and a steam reformer (200) is shown. The steam cracker (100) comprises a steam cracking unit (110) arranged for steam cracking a steam cracking feed stream (1) to produce a steam cracking product stream (2) comprising hydrogen, methane and C2+ hydrocarbons.

The steam cracker (100) further comprises a heat exchanger (120) for cooling the steam cracking product stream (2) to provide a cooled steam cracking product stream (3).

The steam cracker (100) further comprises a separation unit (130) arranged for separating the cooled steam cracking product stream (3) into a first stream (4) comprising hydrogen and methane and some C2 hydrocarbons and a second stream (5) comprising methane and C2+ hydrocarbons.

The steam cracker (100) further comprises a cryogenic separation unit (150) for separating the first stream (4) into a fifth stream (8) comprising hydrogen and a sixth stream (9) comprising methane. In this example, the amount of hydrogen in the fifth stream (8) is at least 90 wt % and the amount of methane in the sixth stream (9) is at least 95 wt %.

The steam cracker (100) further comprises a demethanizer (140) arranged for being fed with the second stream (5) and the sixth stream (9) for producing a third stream (6) comprising methane and a fourth stream (7) comprising C2+ hydrocarbons. In this example, the amount of methane in the third stream (6) is at least 95 wt % and the amount of C2+ hydrocarbons in the fourth stream (7) is at least 99 wt %.

The steam reformer (200) comprises a feed preheater (210) arranged for being fed with the third stream (6) and steam to provide a preheated stream (10).

The steam reformer (200) comprises a steam reforming unit (220) arranged for heating the preheated stream (10) to a temperature of at least 800° C. and steam reforming the heated stream to obtain a steam reforming product stream (11) comprising mainly hydrogen, steam, CO and $CO_2$. The CO and steam are further reacted to hydrogen and $CO_2$, where $CO_2$ and hydrogen constitute 85-95% vol of the product gas.

The invention claimed is:

1. A steam reforming process using a steam reforming system comprising a steam cracker and a steam reformer, wherein the steam cracker comprises:
   i) a steam cracking unit arranged for steam cracking a steam cracking feed stream to produce a steam cracking product stream comprising hydrogen, methane, and C2+ hydrocarbons,
   ii) a heat exchanger for cooling the steam cracking product stream to provide a cooled steam cracking product stream,
   iii) a separation unit arranged for separating the cooled steam cracking product stream into a first, gas stream comprising hydrogen and methane and a second, liquid stream comprising methane and C2+ hydrocarbons,
   iv) a demethanizer arranged for being fed at least with the second stream and producing a third stream comprising methane and a fourth stream comprising C2+ hydrocarbons, wherein the amount of methane in the third stream is at least 95 wt %; and the steam reformer comprises
   v) a feed preheater arranged for being fed with the third stream and steam to provide a preheated stream, and
   vi) a steam reforming unit arranged for heating the preheated stream to a temperature of 800° C. and steam reforming the heated stream to obtain a steam reforming product stream comprising both hydrogen and $CO_2$, wherein the steam cracker further comprises a cryogenic separation unit for separating the first stream into a fifth, gas stream comprising hydrogen and a sixth, liquid stream comprising methane, wherein the demethanizer is arranged for further being fed with the sixth stream, wherein the process comprises the steps of:
   a) steam cracking the steam cracking feed stream by the steam cracking unit to produce the steam cracking product stream,
   b) cooling the steam cracking product stream by the heat exchanger to provide the cooled steam cracking product stream,
   c) separating the cooled steam cracking product stream into the first stream and the second stream by the separation unit,
   d) feeding at least the second stream to the demethanizer to produce the third stream and the fourth stream comprising C2+ hydrocarbons,
   e) feeding the third stream and steam to the feed preheater to provide the preheated stream, and
   f) heating the preheated stream to a temperature of 800° C. and steam reforming the heated stream by the steam reforming unit to obtain the steam reforming product stream;

g) feeding back the third stream from the demethanizer to the heat exchanger, to assist cooling of the steam cracking product stream, and h) feeding back the fifth stream from the cryogenic separation unit to the heat exchanger, to assist cooling of the steam cracking product stream, wherein the third stream comprises C2+ hydrocarbons at an amount of less than 0.5 wt %.

2. A steam reforming process using a steam reforming system comprising a steam cracker and a steam reformer, wherein the steam cracker comprises:

i) a steam cracking unit arranged for steam cracking a steam cracking feed stream to produce a steam cracking product stream comprising hydrogen, methane, and C2+ hydrocarbons, ii) a heat exchanger for cooling the steam cracking product stream to provide a cooled steam cracking product stream, iii) a separation unit arranged for separating the cooled steam cracking product stream into a first, gas stream comprising hydrogen and methane and a second, liquid stream comprising methane and C2+ hydrocarbons, iv) a demethanizer arranged for being fed at least with the second stream and producing a third stream comprising methane and a fourth stream comprising C2+ hydrocarbons, wherein the amount of methane in the third stream is at least 95 wt %; and the steam reformer comprises v) a feed preheater arranged for being fed with the third stream and steam to provide a preheated stream, and vi) a steam reforming unit arranged for heating the preheated stream to a temperature of 800° C. and steam reforming the heated stream to obtain a steam reforming product stream comprising both hydrogen and $CO_2$, wherein the steam cracker further comprises a cryogenic separation unit for separating the first stream into a fifth, gas stream comprising hydrogen and a sixth, liquid stream comprising methane, wherein the demethanizer is arranged for further being fed with the sixth stream, the process consisting of the steps of a) steam cracking the steam cracking feed stream by the steam cracking unit to produce the steam cracking product stream, b) cooling the steam cracking product stream by the heat exchanger to provide the cooled steam cracking product stream, c) separating the cooled steam cracking product stream into the first stream and the second stream by the separation unit, d) feeding at least the second stream to the demethanizer to produce the third stream and the fourth stream comprising C2+ hydrocarbons, e) feeding the third stream and steam to the feed preheater to provide the preheated stream, and f) heating the preheated stream to a temperature of 800° C. and steam reforming the heated stream by the steam reforming unit to obtain the steam reforming product stream; g) feeding back the third stream from the demethanizer to the heat exchanger, to assist cooling of the steam cracking product stream, and h) feeding back the fifth stream from the cryogenic separation unit to the heat exchanger to assist cooling of the steam cracking product stream, wherein the third stream comprises C2+ hydrocarbons at an amount of less than 0.5 wt %.

* * * * *